United States Patent [19]
Straus

[11] 3,761,863
[45] Sept. 25, 1973

[54] APPARATUS FOR COUPLING LOGGING CABLE TO BOREHOLE TOOL

[75] Inventor: Andrew J. D. Straus, Dallas, Tex.

[73] Assignee: Mobil Oil Corporation, New York, N.Y.

[22] Filed: Oct. 18, 1971

[21] Appl. No.: 190,027

[52] U.S. Cl. .................................. 339/28, 285/356
[51] Int. Cl. ............................................. H01r 13/54
[58] Field of Search ...................... 339/28, 89, 177, 339/26; 285/356, 357, 18

[56] References Cited
UNITED STATES PATENTS

| | | | |
|---|---|---|---|
| 2,326,037 | 8/1943 | Jung | 285/356 X |
| 2,481,404 | 9/1949 | Donner | 285/356 X |
| 3,530,423 | 9/1970 | Davis | 339/89 C |
| 3,054,848 | 9/1962 | Reesby et al. | 339/177 R X |
| 2,367,175 | 1/1945 | Hahn | 339/89 R X |

Primary Examiner—Marvin A. Champion
Assistant Examiner—Terrell P. Lewis
Attorney—William J. Scherback et al.

[57] ABSTRACT

Apparatus is provided for coupling a logging cable to a borehole tool. The logging cable is coupled to a cable head which in turn is connected to the borehole tool by way of a hollow, cylindrical mandrel and a concentrically mounted, freely rotatable ring. One end of the mandrel is threaded into the cable head. The other end of the mandrel is inserted into a receptacle in one end of the borehole tool, and the ring is threaded to that end to couple the cable to the borehole tool.

2 Claims, 4 Drawing Figures

Patented Sept. 25, 1973

PRIOR ART

ANDREW J. D. STRAUS
INVENTOR

ANDREW J. D. STRAUS
INVENTOR

APPARATUS FOR COUPLING LOGGING CABLE TO BOREHOLE TOOL

BACKGROUND OF THE INVENTION

This invention relates to well logging and more particularly to apparatus for coupling a logging cable to a borehole tool.

Well logging tools are used extensively in determining various physical properties of subterranean strata penetrated by a borehole. Such properties are determined by lowering a well logging tool, capable of making the desired determination, into the well borehole to the desired strata. The well logging tools are commonly electrically operated and contain sensitive elements which are responsive to the physical properties of the subterranean strata. By measurement or recordation of the response of the sensitive element, information as to the physical properties of the subterranean strata is obtained.

A suitable coupling must be provided for electrically connecting the sensitive element of the borehole tool to the logging cable leading to instrumentation on the surface of the earth. It has been the general practice to couple a borehole tool having coarse, external threads along one end to a cable head having fine, external threads along one end by means of a coupling ring, such ring being internally threaded for engagement with both the borehole tool and the cable head. The pitch of the threads on the borehole tool are different from that of the cable head. That is, for a borehole tool with coarse threads, the cable head will have fine threads. An illustration of this type coupling is set forth in FIG. 1 of the accompanying drawings to assist in an understanding of the prior art. To effect such coupling, the ring is threadably engaged with the first few threads of both the borehole tool and the cable head. Rotation of the ring simultaneously advances the borehole tool and the cable head. As a consequence of the difference in threading pitch, the borehole tool will be advanced more rapidly by the rotation of the ring than will the cable head, thereby effecting a tight fit.

Considerable rotational force is required to effect a tight connection even to the extent that wrenches or hand tools may be needed. Another problem is that well liquids and foreign particles commonly get into the threads of the borehole tool, the cable head, and the coupling ring, thereby requiring the threads to be cleaned prior to each coupling of the cable head to a borehole tool.

SUMMARY OF THE INVENTION

When several logging operations are to be performed utilizing different size and type logging tools, the foregoing-described problems can make the logging operation quite time-consuming and therefore costly to the total logging operation.

The present invention is directed to a coupler, for quickly and easily connecting and disconnecting a logging cable to a borehole tool, which comprises a hollow, cylindrical mandrel and a rotatable ring adapted to be slidably mounted on the mandrel for rotation about and translation along the length of the mandrel. The ring is reduced and threaded at one end. The mandrel is provided with external threads along one end of its outer wall and forms a hexagonal configuration at the other end. The mandrel has a peripheral flange adjacent the hexagonal end. Translational movement of the ring along the mandrel results in a thrust of the ring against the peripheral flange, such thrust advancing the mandrel into the borehole tool.

In assembling the cable head, the threaded end of the ring is mounted over the threaded end of the mandrel. The threaded end of the mandrel is then fitted into a cable head housing in which the logging cable is terminated. A tight fit is effected between the mandrel and cable head by applying torque to the hexagonal end of the sleeve.

In coupling the cable head to the borehole tool, the hexagonal end of the mandrel is inserted into an internally threaded extension of the borehole tool. The ring is then rotated and threadably advanced into the extension, such advancement resulting in a thrust against the flange of the mandrel, thereby advancing the mandrel into the extension to complete the assembly.

The mandrel is circumferentially grooved in the outer wall adjacent its threaded end and also in the peripheral flange adjacent the hexagonal end to retain O-rings. Upon completing the coupling of the mandrel to both the cable head and the borehole tool extension, the entire chamber leading from the logging cable in the cable head through the mandrel and the extension into the borehole tool is sealed by the O-rings from borehole liquids and particles.

DESCRIPTION OF THE PREFERRED EMBODIMENTS

Figure 2A:
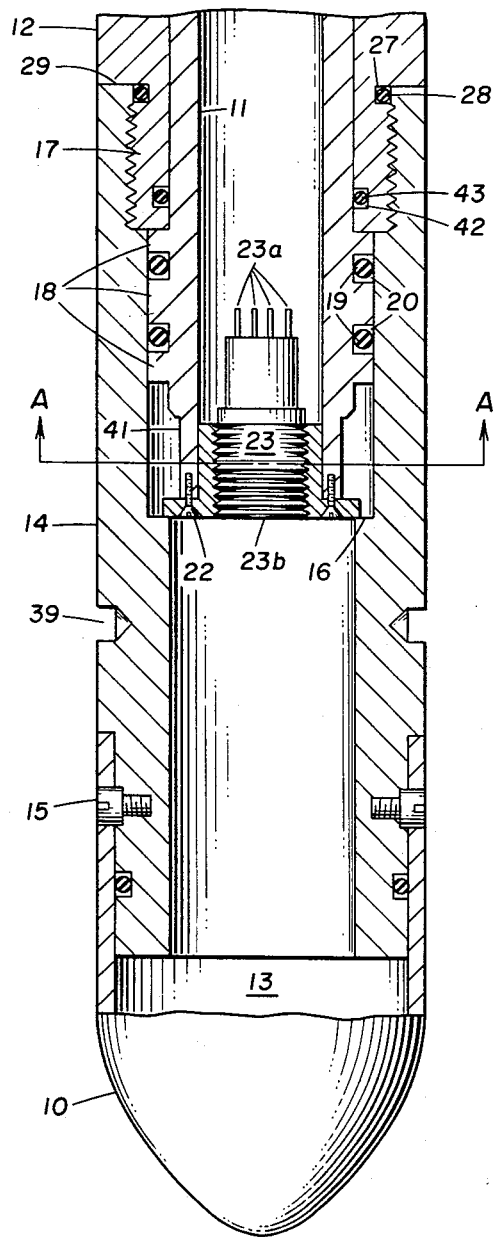
FIGS. 2A and 2B are sectional views of the well logging tool coupler constructed in accordance with the present invention.
Figure 2B:
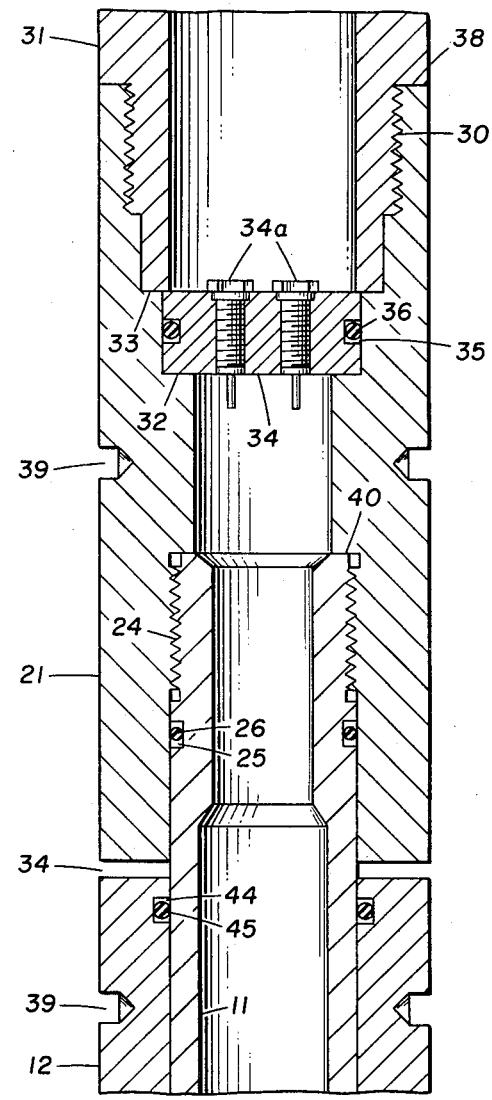

Referring now to FIGS. 2A and 2B, a borehole tool 10 is coupled to a logging cable by a coupler comprised generally of mandrel 11 and a rotatable ring 12.

The borehole tool 10 has a hollow, cylindrical, inner cavity 13 for housing the sensitive logging elements. The tool 10 is affixedly attached to one end of a hollow, cylindrical tool extension 14 by cap screws 15. The other end of said tool extension 14 is bored to provide a shoulder 16. The end portion of the recessed inner wall has threads 17.

Figure 1:
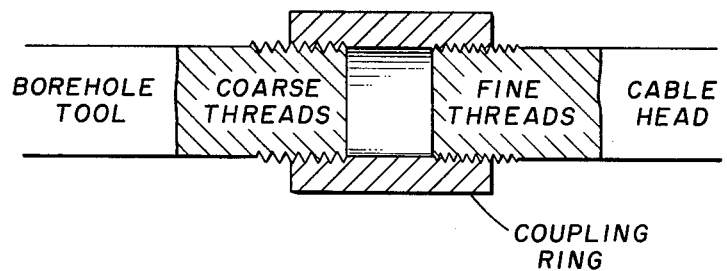
FIG. 1 is a sectional view of a well logging tool coupler representative of the prior art.
Figure 3:
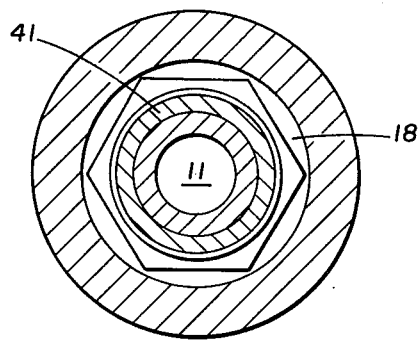
FIG. 3 is an end view of a portion of the well logging coupler of FIGS. 2A and 2B viewed along the line A—A of FIG. 2A.

Mandrel 11 is generally a hollow cylinder with one end of the outer wall machined to form a hexagonal outer surface 41, as can be seen with reference to FIG. 3. The mandrel is machined adjacent the hexagonal end to provide flanges 18 dimensioned to be inserted into tool extension 14. The flanges 18 are separated by circumferential grooves 19 retaining O-rings 20 for sealing the inner chamber of the coupler from borehole liquids and particles. Affixed to the end of mandrel 11 by means of screws 22 is a connector 23 with feed through terminals 23a. Connector 23 is flanged at its receptacle face 23b to provide a surface for abuttedly mating against the shoulder 16 of tool extension 14.

The opposite end of mandrel 11 is provided with external threads 24. The outside wall of mandrel 11 immediately adjacent the threads 24 includes a circumferential groove 25 retaining O-ring 26 for sealing the logging tool from borehole liquids and particles.

Rotatable ring 12 has an internal diameter dimensioned to provide mounting over mandrel 11. The outside wall of ring 12 is recessed to provide for a shoulder 29. The recessed outer wall is threaded along much of its length with the same gauge threads as threads 17 of tool extension 14 and has a circumferential groove 27 located adjacent the shoulder 29 for retaining O-ring 28 which engages tool extension 14. The inner surface of ring 12 has two circumferential grooves 42 and 44 for retaining O-rings 43 and 45 which engage mandrel 11. Engagement of ring 12 with tool extension 14 causes ring 12 to be advanced into tool extension 14, with the resulting thrust of the ring 12 against flange 18 advancing mandrel 11 to a point where the connector 23 engages shoulder 16 of tool extension 14.

Cable head 21 is a hollow, cylindrical housing with internal threads at one end of the same gauge as threads 24 on mandrel 11. A shoulder 40 limits the movement of mandrel 11. Cable head 21 is also internally threaded at the opposite end with threads 30 to provide for connection with logging cable casing 31. Cable head 21 is bored and counterbored to provide a shoulder 32.

A connector 34 is provided with a circumferential groove 35 retaining O-ring 36 for sealing the cable head 21 from borehole liquids and particles. Connector 34 is held fixed with respect to cable head 21 by one end 33 of casing 31 which engages one side of the terminal and forces the other side against shoulder 32. The casing 31 is a hollow, cylindrical casing externally threaded to connect with the threads 30 of cable head 21. A logging cable (not shown) will pass through the casing 31 and connect with feed through terminals 34a of connector 34.

As previously discussed, it is a specific feature of the present invention to provide a coupler which can be quickly and easily disconnected. Nevertheless, there are provided spanner holes 39 in each the tool extension 14, the ring 12, the cable head 21, and the casing 31. Such spanner holes are provided should it be found desirable or even necessary under abnormal operating conditions, such as freezing temperatures, to use greater torque in connecting and disconnecting the coupler.

There has been shown in the preferred embodiment herein a tool extension 14 connected to the borehole tool 10 by way of screws 15. However, it would be possible to design a logging tool wherein the borehole tool and the tool extension are integral.

Likewise, there has been shown in the preferred embodiment a cable head 21 mated to a logging cable casing 31. Again, it would be possible to design a logging tool wherein the cable head and the logging cable casing are integral.

To connect the cable head 21 to the borehole tool 10, the ring 12 is first slipped over mandrel 11. A cable (not shown) is then electrically coupled from terminals 23a of connector 23 through the chamber provided by mandrel 11 to terminals 34a of connector 34 in cable head 21. Mandrel 11 is then threaded into cable head 21. Such threading is accomplished by engaging a wrench or other suitable tool with the hexagonal end of mandrel 11 and rotating the mandrel until it is in tight abutment fit with shoulder 40 of cable head 21. Another cable (not shown) leading from the sensitive elements of the borehole tool 10 and passing through tool extension 14 is then electrically coupled to terminals 23a of connector 23. Mandrel 11 is then inserted into tool extension 14 until the threads of ring 12 can be engaged with the threads 17 of tool extension 14. Ring 12 is rotated and threadably advanced into tool extension 14, thereby providing a thrust against the flange 18 of mandrel 11 to advance mandrel 11 and connector 23 to a point where connector 23 is abuttedly mated with shoulder 16 of tool extension 14. An easy connection of ring 12 with tool extension 14 is thereby effected since very little rotational force is required to thread ring 12 into tool extension 14. It will be noted that after ring 12 is completely engaged with tool extension 14 and connector 23 is abuttedly mated with tool extension 14, there is a space 34 between ring 12 and cable head 21 which allows ring 12 to be rotated in reverse direction so as to disengage the coupling of mandrel 11 with tool extension 14.

It is another feature of the present invention to provide a coupler which is sealed from borehole liquids and particles under the borehole pressure of a logging operation, thereby allowing an operator to disconnect the mandrel from the borehole tool after a logging operation and to connect another borehole tool to the mandrel without having to clean borehole liquids and particles from in and around the mandrel. Such a sealing is provided by O-rings 20 retained in mandrel 11 and O-rings 28, 43, and 45 retained in ring 12. A further sealing is provided for the cable head 21 by O-ring 26 retained in mandrel 11 and O-ring 36 retained in connector 34. Consequently, the entire chamber of the coupler from connector 34 through cable head 21, mandrel 11, and tool extension 14 to borehole tool 10 is sealed from borehole liquids and particles and will remain at atmospheric pressure under which the assembly operation is carried out.

Various modifications to the disclosed embodiment as well as alternate embodiments may become apparent to one skilled in the art without departing from the scope and spirit of the invention as defined by the appending claims.

I claim:

1. Well logging apparatus for connecting a logging cable to a borehole tool, comprising:
   a. a hollow, cylindrical borehole tool having a closed end for containing the borehole instrumentation and an open end bored to provide an internal shoulder, said open end being internally threaded along a portion of the bore immediately adjacent said open end,
   b. a hollow, cylindrical cable head housing internally threaded along one end and containing a first connector concentrically mounted therein, said logging cable being connected to said first connector,
   c. a hollow, cylindrical mandrel with a peripheral flange adjacent one end for insertion into said borehole tool and having the other end externally threaded for engagement with the internal threading of said cable head,
   d. a second connector mounted concentrically within said mandrel and forming an integral part of the end of said mandrel which is adapted to be slidably inserted into said borehole tool, and
   e. a rotatable ring slidably mounted over the threaded end of said mandrel and threadably engaged by external threading with the internal threading of said borehole tool whereby, upon rotation, said ring is advanced into said borehole tool with the resulting thrust of said ring against said peripheral flange of said mandrel advancing said mandrel into said borehole tool and into an abutment mating with the internal shoulder of said borehole tool, said logging cable being electrically coupled from said first connector in said cable head housing through the passageway provided by said cable head housing and said mandrel to said second connector in said mandrel and from said second connector to the borehole instrumentation within said borehole tool.

2. The coupler as set forth in claim 1 wherein:
said mandrel further includes O-rings retained in circumferential grooves in said peripheral flange and immediately adjacent said threaded portion, thereby providing a seal at the surface interface points of said mandrel with both said borehole tool and said cable head housing for sealing the passageway from said cable head housing to said borehole tool.

* * * * *